(No Model.)
H. F. BOCK.
HUB ATTACHING DEVICE FOR VEHICLE AXLES.
No. 444,517. Patented Jan. 13, 1891.
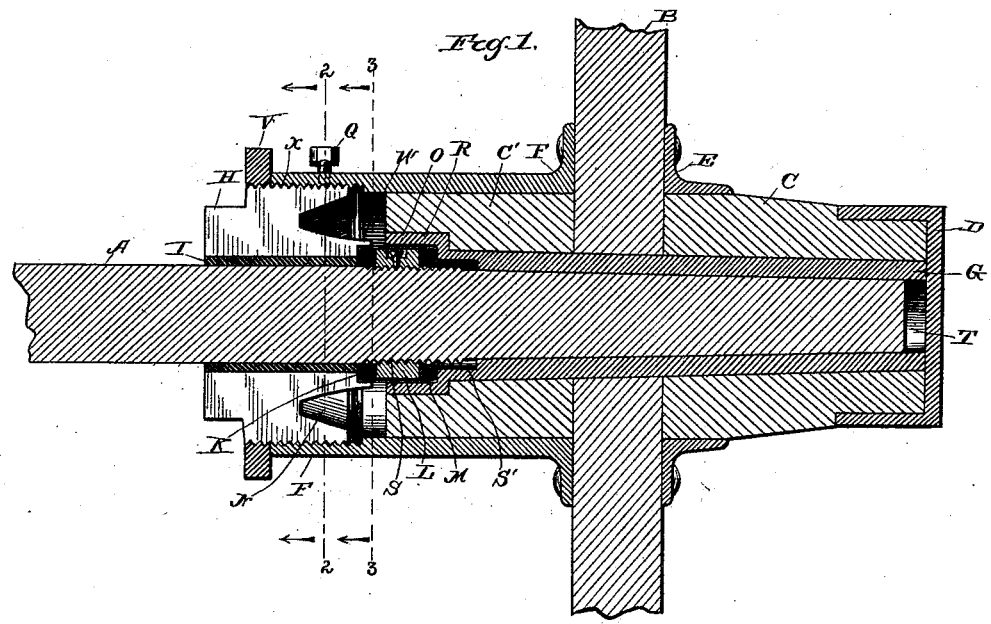
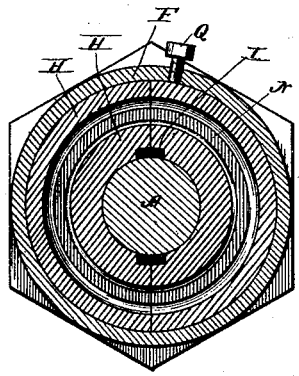
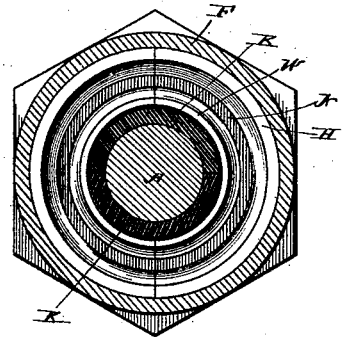
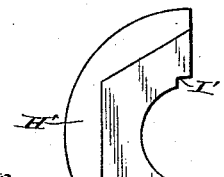
Witnesses:
Wm. M. Rheem.
Frederick Searle.
Inventor:
Henry F. Bock
By Butterworth, Hall, Brown & Smith
Atty's

UNITED STATES PATENT OFFICE.

HENRY F. BOCK, OF SEESTER, ILLINOIS.

HUB-ATTACHING DEVICE FOR VEHICLE-AXLES.

SPECIFICATION forming part of Letters Patent No. 444,517, dated January 13, 1891.

Application filed March 4, 1890. Renewed November 10, 1890. Serial No. 370,843. (No model.)

*To all whom it may concern:*

Be it known that I, HENRY F. BOCK, a citizen of the United States, residing at Seester, in the county of Cook and State of Illinois, have invented a new and useful Improvement in Hubs, Axles for Vehicles, &c., of which the following is a specification.

My invention relates to improvements in the construction of hubs for wheels supported upon axles or journals, in connection with a device to retain the wheel upon the axle and an arrangement for lubricating the axle.

The objects of my improvement are, first, to provide a specially-adapted and simple means for retaining the hub or wheel securely on the axle or journal and a continuously-lubricated bearing for the same. I attain these objects by the mechanism illustrated in the accompanying drawings, in which—

Figure 1 is a vertical longitudinal sectional view of the entire arrangement of the hub and axle with the retaining and lubricating devices. Fig. 2 is a cross-sectional view of the same, taken at the line 2 2. Fig. 3 is another cross-sectional view of the same. Fig. 4 is a posterior view of the two sections of the lubricating-block H.

Similar letters refer to similar parts throughout the several views.

The axle A is provided with a screw-thread S at a point proportional from the end of the axle, the distance at which the thread of the screw is located on the axle or journal being optional and depending upon the size of the wheel and the judgment of the mechanic. A collar L is provided with an interior thread-screw S, adjusted to fit closely and be screwed upon the axle and to be firmly held in place by means of a set-screw O. It is not essential that this collar shall be adjusted and held upon the axle by means of a thread-screw, but it may be made integrally with the axle and part thereof; but I prefer the former construction, as it thereby enables an adjustment to be made with reference to the collar and lubricating device of the hub, as hereinafter explained.

The hub of the wheel E F C is provided with an interior cylindrical thimble G, having a recess S' and an annular shoulder R, so constructed and adjusted as to diameter and length as to fit upon the axle, leaving a small space between the end of the axle and the interior extension of the thimble or hub, as shown by the space T, while the annular shoulder of the thimble presses closely to the edge of the collar L, between which and the collar is located a removable annular washer M, made of metal, leather, or other suitable material. The hub is provided with an exterior band or thimble F, possessing a screw-thread X, into which is screwed the lubricating-block H, possessing its corresponding screw-thread, and by means of which the lubricating-block is held firmly and adjustably, and when located in place is held by means of a set-screw Q. The screw-thread of the exterior band or thimble F may be interior or exterior and that of the lubricating-block to correspond; but I prefer it should be as shown in the drawings, Fig. 1. The band or thimble of the hub and the lubricating-block may be united and joined adjustably and firmly without screw-threads by other well-known means.

The lubricating-block H may be made of metal or wood or other material, though I prefer to make it of metal. It is constructed with an exterior screw-thread, as explained, and the diameter of its main bore corresponds closely to that of the axle behind the collar L. It may be made of one solid piece of material or of two or more pieces; but I prefer to construct it of two equal segmental parts, as shown, the surface at the sections being plain and adjusted so as to meet closely where the two parts are put together. At the interior angle of each of the sections is a longitudinal recess at I' to admit a packing I where the two segments are united and attached to the hub.

The lubricating-block is provided on its interior face with an annular groove N, designed to hold and carry the lubricating material, the interior lips of this groove projecting farther interiorly than the extension-lips, and is rabbeted at W to enable this interior projection to extend over the washer K. A locking-nut V, provided with a screw-thread corresponding to that of the lubricating-block, is screwed upon the rear of the latter and holds the lubricating-block more firmly in position with the hub and tends to prevent any movement on the screw-thread.

With this description in detail I now explain the construction and operation of my invention. The collar L having been firmly placed upon the axle, the washer M is placed next to its interior edge, and the hub of the wheel is then put in place on the axle until the shoulder R of the thimble G rests against the washer M. The washer K and the lubricating-block, with its packing I, are then united around the axle and the latter screwed into position until the rabbeted projection W of the lubricating-block presses the washer K closely against the edge of the collar L. The union of the block and hub are then made fixed by the set-screw Q and locking-nut V.

Lubricating material can be introduced into the annular chamber N by an orifice in the line 3 3 or at any other point and in the usual manner of introducing lubricants to journals. It is not necessary that the lubricating-chamber shall be filled with lubricating material. I prefer to use a quantity simply sufficient to fill the chamber up to the lower line of the axle. The revolutions of the hub on the axle will distribute the lubricating material to all parts of the chamber, and it will pass through the space between the thimble and collar L and the washers onto the axle, both interiorly and exteriorly to the collar, and keeps the same continually lubricated without any waste or loss of the lubricant.

The rabbeted projection of the lubricating-block at W constitutes a shoulder, which rests against the washer K and the collar L and prevents any lateral movement of the hub toward the end of the axle, so that by means of the collar L and the construction of the hub and lubricating-block the wheel in its revolution on the axle is held firmly in place and lateral movement in either direction prevented.

Having described my invention, what I claim, and desire to secure a patent for, is as follows:

1. The combination of an axle having a projecting collar upon it with a hub or wheel and a lubricating-block provided with an annular recess, both walls of which are contained within said block, substantially as and for the purposes set forth.

2. The combination of an axle having a projecting collar upon it with a hub or wheel and a lubricating-block containing an annular recess for retaining the lubricant, said recess being wholly in the face of said block, and the interior bores of said hub or wheel and of said lubricating-block provided with shoulders resting, respectively, against the opposite sides of said collar, substantially as shown.

3. The combination of an axle and a journal having a projecting collar fixed adjustably upon it by screw-threads, said collar guarded on each side by removable washers, with a hub or wheel having a cylindrical thimble enlarged at its inner end so as to form a recess and a shoulder resting against one of said washers, and a lubricating-block containing an annular groove to retain the lubricant, and the inner projection of which is rabbeted so as to form a shoulder resting against the inner edge of the other washer, substantially as shown.

4. The combination of an axle or journal having a projecting collar fixed adjustably upon it by screw-threads, said collar being guarded by a movable washer on each side of it, the interior washer being in two segments, with a hub or wheel having a cylindrical thimble provided at its interior end with an enlargement of the cylinder forming a recess and a shoulder resting against one of said washers, said hub also provided with an exterior band or thimble with screw-thread, and a lubricating-block possessing on its exterior extension a screw-thread and containing an annular groove to retain the lubricant, and the inner projection of which is rabbeted so as to form a shoulder resting against the inner edge of said other washer, and a locking-nut, substantially as shown.

5. A lubricating-block composed of two sections containing in its inner face an annular groove, the interior projections of which are rabbeted so as to form a shoulder, the inner angle of the surfaces of the sections having recesses to admit a packing at the sections, and the block provided with a screw-thread, in combination with an axle or journal and a hub or wheel, substantially as shown.

6. The combination of an axle, a hub, and a lubricating-block between such hub and axle, said block having a flaring recess, one wall of which slopes or inclines toward and extends to such axle, substantially as shown and described.

HENRY F. BOCK.

Witnesses:
FREDERICK PEARLE,
L. C. MERRILL.